April 27, 1943.  E. P. BOLEN ET AL  2,317,583

TRIM PANEL

Filed June 16, 1941

INVENTORS
EDWARD P. BOLEN
EDWARD R. DETRICK
BY Whittemore, Hulbert + Belknap
ATTORNEYS Patented Apr. 27, 1943

2,317,583

UNITED STATES PATENT OFFICE 2,317,583

TRIM PANEL

Edward P. Bolen and Edward R. Detrick, Detroit, Mich., assignors to National Automotive Fibres, Inc., Detroit, Mich., a corporation of Delaware Application June 16, 1941, Serial No. 398,324

7 Claims. (Cl. 45—138)

The present invention relates to trim panels and refers more particularly to a means for decorating trim panels.

Heretofore, molding strips have been employed to impart a decorative effect to trim panels. Ordinarily the molding strips comprise bars or strips of metal having a rounded exterior surface which is ordinarily chromium plated or otherwise treated to have a desirable appearance.

In the past these molding strips have been applied to the flat outer surface of the upholstery material of a trim panel, with the result that they stand out to an undesirable degree and have the corners exposed, hence they provide a less decorative appearance than is desirable.

According to the present invention we prefer to modify the prior constructions by providing a "debossing" effect on the trim panel. This is carried out by one of several means disclosed herein, and the effect is to provide a panel board in which the trim fabric overlying the panel board forms a debossed channel, or groove, or hollow for the reception of trim molding or other decorative element. Specifically, this effect is carried out by elevating the trim fabric at the sides of the channel.

The invention is equally applicable to improve the appearance of plaques or other decorative insignia or emblems which may be attached to trim panels.

An object of the present invention is to improve the appearance of interior trim panels provided with decorative plaques or trim molding strips by providing a debossed groove or recess for the reception of the plaque or molding strip.

Other objects of the invention will be apparent as the description proceeds, and when taken in conjunction with the accompanying drawing, wherein.

A trim panel used in the interior trim of automotive vehicles normally has a panel board, which may be of an asphalt or bituminous impregnated fibrous material. To this trim panel padding material is normally applied, and over the padding material a fabric is applied which is the same or harmonizes with the fabric employed in the seats and backs of the vehicle.

Figure 1:
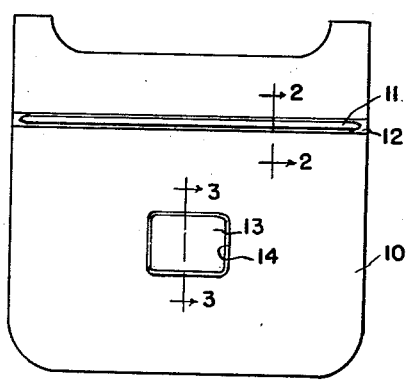
Figure 1 is a front elevation of a trim panel to which, for purposes of illustration, we have shown applied to both a trim molding strip and a decorative plaque.
Figure 2:
Figure 2 is a schematic section, on an enlarged scale, taken on the line 2—2, Figure 1.
Figure 3:
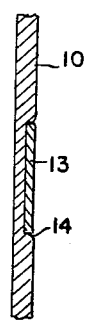
Figure 3 is a schematic section, on an enlarged scale, taken on the line 3—3, Figure 1.

In Figure 1 we have illustrated the front elevation of such a trim panel 10 to which a molding strip 11 is applied, the molding strip being seated in a debossed groove indicated at 12. In the same figure we have shown a plaque or other decorative emblem 13 which is seated in a debossed recess indicated at 14. Figures 2 and 3 show enlarged sections through the molding strip 11 and the plaque 13, and illustrate the construction. It will be appreciated that in Figures 2 and 3 the trim panel 10 is indicated as unitary, and no effort is made to show therein the panel board and trim fabric separately.

Figure 4:
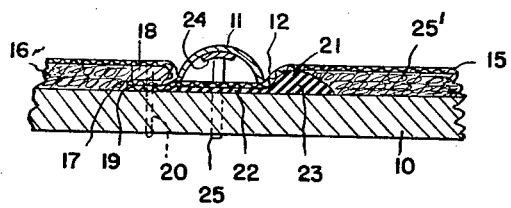
Figure 4 is a fragmentary section through a trim panel illustrating a preferred method of providing a molding strip.

Referring now to Figure 4, we illustrate a preferred manner of obtaining the effect shown generally in the preceding figures. In this figure the panel board 10 is provided with two separate trim fabrics 15 and 16, which desirably are of different but harmonizing colors. The trim fabric 16 has its free inner edge portion 17 formed around a breaker strip 18, which may be of cardboard. The free edge portion 19 of the fabric 15 extends under the folded edge portion 17 of the fabric 16. The breaker strip and the free edge portions 17 and 19 of the fabrics 15 and 16, respectively, are secured to the panel board 10 as by sewing, stapling, or the like, as indicated by the numeral 20. Beneath the fabric 15 is a rubber element 21 which is formed to provide a thin film of rubber, as indicated at 22, and a bead or riser as indicated at 23. Due to the presence of the breaker strip 18 and the bead or riser of rubber 23, the trim fabrics are raised to provide beads which define therebetween the debossed recess 12 previously referred to. The molding strip 11 may be secured in the debossed recess 12 in any suitable manner. In Figure 4 we have indicated a strip 24 secured to the underside of the molding strip 11 and having integral prongs 25 which penetrate the panel board 10 and are clinched or otherwise secured to the inner surface thereof. Fibrous padding material is indicated at 25'.

The construction illustrated in detail in Figure 4 may conveniently be made by the following method: The strip 21 of uncured, quickly vulcanizable rubber is first attached to the panel board 10, then the trim fabric 15 is placed thereover, with its free edge portion 19 extending to or beyond the edge of the rubber. The fabric 16 is next placed over the fabric 15, with its dress side downwardly, and its free edge portion 17 is brought into registry with the free edge portion 19 of the fabric 15. The breaker strip 18 is then positioned over the free edge portions 17 and 19 whereupon the sewing or stapling operation is carried out in a manner to provide the securing means indicated at 20 in Figure 4. The fabric 16 is then folded around the breaker strip 18 to the position shown in Figure 4 and is secured by adhesion or otherwise to the edges of the panel board.

The assembly is then placed on a table and a heated die having a flat bottom corresponding in width to the width of the decorative trim molding 11 is brought down and pressure is exerted on the fabric 15 at the point where the debossment is to be provided. The rubber as it is heated becomes somewhat fluid, and is displaced by the pressure applied into the thickened bead or riser indicated at 23. Since the flat bottom heated die element is of a width equal to the desired width of the debossment, the debossment is provided in precisely the right size and location on the panel board. Pressure is applied through the heated die for an interval sufficient to vulcanize the rubber so that it retains the displaced position shown in the figure. At the same time, the fabric 15 will be vulcanized to the panel board by the thin film of rubber 22.

In applying the decorative plaque, such as shown at 13 in Figures 1 and 3, any suitable method may be employed to provide a debossment of any desired shape or size. Thus for example, while we have illustrated a generally rectangular plaque in Figure 1, it will be appreciated that the same might be circular, or might conform to the shape of an advertising emblem if desired. The plaque 13 may be secured in any convenient manner as by stapling, or by prongs.

The result of the provision of a debossment for the reception of a plaque or trim molding is to improve the appearance of the completed article. Instead of the plaque or trim molding having the appearance of being crudely attached to a flat surface of a trim fabric it appears to be set into the article, with the result that the completed article has an appearance of richness unattainable in previously known constructions. At the same time, by providing the debossment defined by beads or ridges surrounding the debossment, the edges of the plaque or molding strip may be concealed to any desirable extent, which is oftentimes rendered necessary or desirable by their unfinished condition.

In addition, the embodiment of our invention illustrated in Figure 4 is particularly useful in trim panels in which two different colors of fabrics are employed, and serves the purpose not only of concealing the seam joining the two fabrics but imparts an additional richness thereto by reason of the debossing effect.

Trim panels of this type are oftentimes provided with padding material in the form of very light fluffy cotton. It is this type of material which is illustrated in the figures. By the provision of riser members of a firm material such for example as cardboard or cured soft rubber, it is possible to define a groove or recess with great exactness and to impart a smooth finished appearance to the fabric at the point where it is debossed over the risers into the recess. It will be appreciated of course that the invention may be practiced without padding material on the panel board, in which case the beads in the fabric formed by the riser elements provide what may be termed frames for the molding strips or plaques.

While we have illustrated one embodiment of our debossment for the reception of plaques, molding strips, and similar articles, and have referred specifically to its use in decorating automotive trim panels, it will be understood that the invention is susceptible to use in widely varying fields, and the foregoing complete description has been given merely to enable those skilled in the art to practice the invention, the scope of which is indicated by the appended claims.

What we claim as our invention is:

1. A trim panel having a panel board, padding material on said panel board, a rubber strip on the panel board beside an edge of the padding material, said rubber strip having a flattened portion and provided between the flattened portion and adjacent edge of the padding material with a riser portion, trim fabric extending over the padding material and riser portion and having a portion disposed in surface to surface relation upon said flattened portion, and ornamental molding upon the fabric portion just mentioned and secured to the panel board.

2. A trim panel having a panel board, padding material spaced apart on said panel board and cooperating therewith to provide an outwardly opening channel shaped recess, a breaker strip and a resilient strip within and extending longitudinally of said recess, the breaker strip being at one side edge of the recess, the resilient strip having a longitudinally extending bead at the other side edge of the recess and having a relatively thin substantially flat portion on the bottom of the recess between said bead and breaker strip, trim fabric upon the surface of the padding material at one side of said recess and having a portion folded inwardly around and beneath said breaker strip, trim fabric upon the surface of the padding material at the other side of said recess and having a portion overlying the bead and flat portion respectively of the resilient strip and extending beneath the folded portion of the first mentioned fabric, and means holding the parts in assembled relation including securing elements extending through the breaker strip and portions aforesaid of said fabrics and engaging said panel board, and a molding strip upon the portion of the second mentioned fabric between the bead and breaker strip and secured to said panel board.

3. A trim panel having a panel board, padding material spaced apart on said panel board and cooperating therewith to provide an outwardly opening channel shaped recess, a breaker strip and a resilient strip within and extending longitudinally of said recess, the breaker strip being at one side edge of the recess, the resilient strip having a longitudinally extending bead at the other side edge of the recess and having a relatively thin substantially flat portion on the bottom of the recess between said bead and breaker strip, trim fabric upon the surface of the padding material at one side of said recess and having a portion folded inwardly around and beneath said breaker strip, trim fabric upon the surface of the padding material at the other side of said recess and having a portion overlying the bead and flat portion respectively of the resilient strip and extending beneath the folded portion of the first mentioned fabric, and means holding the parts in assembled relation including securing elements extending through the breaker strip and portions aforesaid of said fabrics and engaging said panel board.

4. A trim panel having a panel board, padding material spaced apart on said panel board and cooperating therewith to provide an outwardly opening channel shaped recess, a breaker strip and a resilient strip mounted upon the panel board, within and extending longitudinally of said recess, the breaker strip being at one side edge of the recess, the resilient strip having a longitudinally extending bead at the other side edge of the recess and having a relatively thin substantially flat portion on the bottom of the recess between said bead and breaker strip, trim fabric upon the surface of the padding material at one side of said recess and having a portion folded inwardly around and beneath said breaker strip, trim fabric upon the surface of the padding material at the other side of said recess and having a portion overlying the bead and flat portion respectively of the resilient strip and extending beneath the folded portion of the first mentioned fabric, and a decorative element mounted upon the portion of the second mentioned fabric between the bead and breaker strip, and secured to said panel board.

5. A trim panel having a panel board, a breaker strip and a resilient strip on said panel board, the resilient strip having a longitudinally extending bead spaced from the breaker strip and having a relatively thin substantially flat portion between said bead and breaker strip, trim fabric for the panel board extending over the breaker strip and having a portion folded inwardly around and beneath said breaker strip, trim fabric for the panel board having a portion overlying the bead and flat portion respectively of the resilient strip and extending beneath the folded portion of the first mentioned fabric, and means holding the parts in assembled relation including securing elements extending through the breaker strip and portions aforesaid of said fabrics and engaging said panel board, and a molding strip upon the portion of the second mentioned fabric between the bead and breaker strip and secured to said panel board.

6. A trim panel having a panel board, a breaker strip and a resilient strip on said panel board, the resilient strip having a longitudinally extending bead spaced from the breaker strip and having a relatively thin substantially flat portion between said bead and breaker strip, trim fabric for the panel board extending over the breaker strip and having a portion folded inwardly around and beneath said breaker strip, trim fabric for the panel board having a portion overlying the bead and flat portion respectively of the resilient strip and extending beneath the folded portion of the first mentioned fabric, and means holding the parts in assembled relation including securing elements extending through the breaker strip and portions aforesaid of said fabrics and engaging said panel board.

7. A trim panel having a panel board, a breaker strip and a resilient strip secured to said panel board, the resilient strip having a longitudinally extending bead spaced from the breaker strip and having a relatively thin substantially flat portion between said bead and breaker strip, trim fabric for the panel board extending over the breaker strip and having a portion folded inwardly around and beneath said breaker strip, trim fabric for the panel board having a portion overlying the bead and flat portion respectively of the resilient strip and extending beneath the folded portion of the first mentioned fabric, and a decorative element mounted upon the portion of the second mentioned fabric between the bead and breaker strip, and secured to said panel board.

EDWARD P. BOLEN.
EDWARD R. DETRICK.